Aug. 15, 1967 C. E. BLINN 3,336,496

HIGH POWER TRAVELING WAVE TUBES AND COUPLING MEANS THEREFOR

Filed Oct. 7, 1963

INVENTOR.
CHARLES E. BLINN

BY Harry E. Aine

ATTORNEY

United States Patent Office 3,336,496

Patented Aug. 15, 1967

3,336,496
HIGH POWER TRAVELING WAVE TUBES AND COUPLING MEANS THEREFOR

Charles E. Blinn, Sunnyvale, Calif., assignor to Varian Associates, Palo Alto, Calif., a corporation of California Filed Oct. 7, 1963, Ser. No. 314,465
14 Claims. (Cl. 315—3.6)

ABSTRACT OF THE DISCLOSURE

By incorporating velocity modulation resonant cavity beam-wave coupling mechanism at the R.F. input of a traveling wave tube amplifier spurious oscillations are inhibited from coupling to the drive line and causing destruction thereof. By including cut-off drift tube means over the operating range of frequencies to be amplified and R.F. attenuation means downstream from the drift tube section absorption of unwanted R.F. energy is accomplished without absorption of R.F. energy to be amplified since it has been converted to beam modulation at the input coupler.

This invention relates in general to traveling wave tubes and coupling means therefor and particularly to novel coupling means which enables the traveling wave tube (TWT) slow wave circuit to be isolated from the input circuit of the tube over the operating band of the circuit.

Present state of the art traveling wave tubes are subject to diverse types of oscillation. These oscillations result in instability over the operating range of the tube. Typical oscillations encountered in traveling wave type tubes are band edge oscillations and backward wave oscillations (BWO's). Backward wave oscillations are excited when the gain of the circuit is greater than unity for the BWO frequency and the phase difference between the beam velocity and the traveling wave velocity produce a feedback loop of zero (or 180) degrees.

Band edge oscillations are caused by the fundamental mode operating near the cutoff frequency of the resonant structure at some range of beam voltages. For example, a high power traveling wave tube designed for operation at 120 kv. when excited with a 120 kv. pulse will generally have band edge oscillations excited on the slow wave circuit as the beam voltage pulse sweeps through its complete voltage range. Such oscillations can couple to the R.F. input and are therefore undesirable where stability is desired. BWO's are also undesirable since besides resulting in instabilities such oscillations can couple into the R.F. input circuit, and thereby result in destruction of the input circuit due to arcing and burning occurring therein. For example, peak powers of 50 kw. to 100 kw. have been observed in the input line of a traveling wave tube such as shown in FIG. 1 using a conventional input circuit (coaxial line) during pulsed operating conditions. Such peak powers have resulted in carbonization of Teflon in the input cable and associated components.

Prior art traveling wave tubes having helix derived slow wave circuits and other circuits such as the cloverleaf, for example, have generally employed coaxial coupling means for the R.F. energy, wherein the center conductor of the coaxial line is directly coupled to the slow wave circuit. These circuits present tube designers with difficult impedance matching problems with respect to providing optimum impedance between the coupler and the circuit for the fundamental mode of operation. Since direct coupling of the R.F. input circuit through the slow wave structure is utilized, it is undesirable to provide a circuit termination impedance or other attenuating device at the input of the tube. The rationale for this is that if attenuating material were placed at the input portion of the slow wave circuit such material would, in addition to suppressing spurious microwave oscillations, also suppress the energy of the fundamental or operating mode unless mode selectivity was observed with regard to the placement of the attenuating material with regard to the fundamental mode which of course would not result in suppression of band edge oscillation of the fundamental mode induced by the beam voltage during pulsed operation.

The present invention obviates the above mentioned difficulties by the utilization of a novel coupling circuit. This circuit is particularly adapted for coupling to the cloverleaf type slow wave circuit. However, the novel coupling circuit of the present invention may be advantageously employed with any known slow wave circuit. Drift tube coupling means are utilized, wherein a conventional klystron type resonant cavity, having a pair of drift tubes disposed along the central axis thereof, surrounds the electron beam axis and serves to couple R.F. energy directly to the beam. The advantages to be derived from such a scheme are as follows.

First of all, more uniform coupling is achieved as well as increased gain and efficiency over the operating range of the tube. Furthermore, gain fluctuations, efficiency fluctuations and power instabilities are reduced in comparison to conventional coupling techniques. Impedance mismatches are minimized since impedance is a function of the physical circuit parameters and the present invention by coupling directly to the electron beam rather than the slow wave circuit eliminates variations in circuit physical parameters as a source of mismatch. The resonant coupling technique employed herein, reduces impedance matching problems since the coupling coefficient is a function only of the electron beam and not the physical parameters of the slow wave circuit. The gain of a traveling wave tube is also advantageously enhanced by the novel input coupler of the present invention.

The present invention furthermore eliminates BWO's from the input circuit or the drive line of the tube by virtue of the fact that the drift tube coupling means for the R.F. energy is beyond cutoff for the operating frequency, including the band edges of the tube, hence, any oscillations present within the tube within and below the above specified range, are precluded from entering the drive line. Stabilization of the slow wave circuit is enhanced through the use of an attenuating means positioned at the input of the circuit. The use of attenuation means at the input of a traveling wave tube has heretofore been undesirable since the positioning of such an attenuating or terminating means at the input portion of the tube would result in suppression of the R.F. input energy as well as suppression of spurious oscillations or R.F. reflections present within the tube. The present invention, however, since direct coupling to the electron beam is utilized which results in velocity modulation of the electron beam rather than R.F. propagation at the input permits attenuation means to be positioned at this point without attenuating the R.F. input energy since the R.F. energy has been converted into velocity modulation of the electron beam and, therefore, will not be affected to any significant degree by the presence or the absence of the attenuation means.

It is, therefore, the object of the present invention to provide a novel traveling wave tube and coupling means therefor with a resultant improvement in gain, efficiency and stability.

A feature of the present invention is the provision of a TWT having resonant circuit coupling means therefor.

Another feature of the present invention is the provision of a TWT having a multiple cavity resonant circuit input therefor.

Another feature of the present invention is the provision of a TWT having drift tube coupling means wherein the drift tube is cut off over the operating band of the tube including the upper band edge.

Another feature of the present invention is the provision of a TWT having resonant circuit coupling means therefor, wherein suitable attenuation means are positioned at the input portion of the traveling wave tube.

Another feature of the present invention is the provision of resonant circuit R.F. coupling means in conjunction with a beam coupling drift tube which is cutoff for the operating band including the upper band ege of a TWT.

These and other features and advantages of the present invention will become more apparent upon a perusal of the following specification taken in conjunction with the accompanying drawings wherein.

Figure 1:
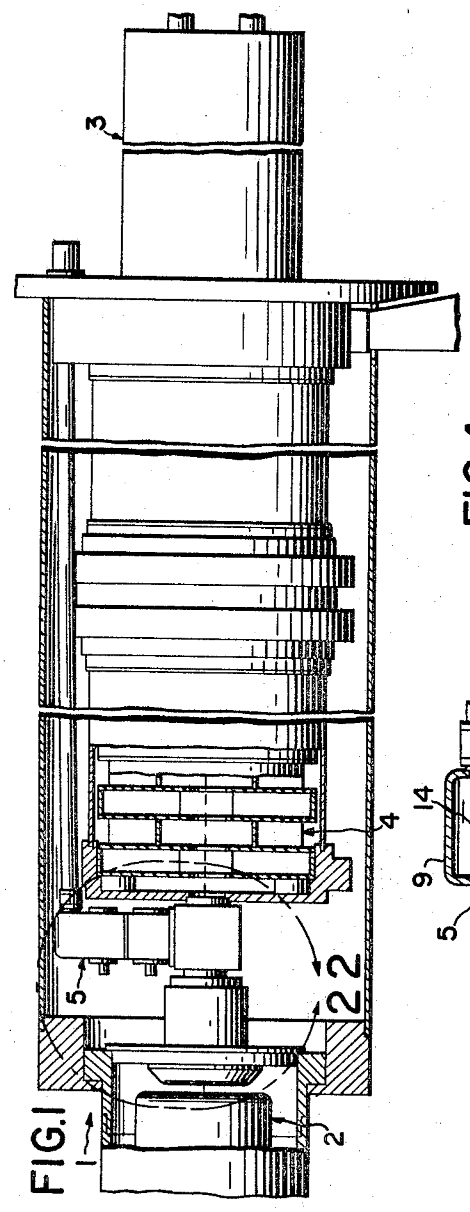
FIG. 1 is a transverse cross-sectional view partially in elevation of a high powered traveling wave tube incorporating the novel coupling means therein.

Referring now to FIG. 1 in detail, there is shown therein a TWT 1 having conventional cathode and electron gun means 2 and collector means 3 together with an intermediate slow wave circuit 4. The electron gun means, collector and slow wave circuit are as generally shown in copending application U.S. Ser. No. 56,415, now abandoned in favor of continuation-in-part application U.S. Ser. No. 443,612 filed Mar. 29, 1965. by Ruetz et al. assigned to the same assignee as the present invention.

The novel input circuit of the present invention is delineated by lines 2—2 in FIG. 1 and is represented by reference numeral 5. The particular details of the slow wave circuit, electron gun and collector section, housing and other peripheral attachments for the traveling wave tube of FIG. 1 are similar to the corresponding parts shown and described in the aforementioned copending U.S. application.

Figure 2:
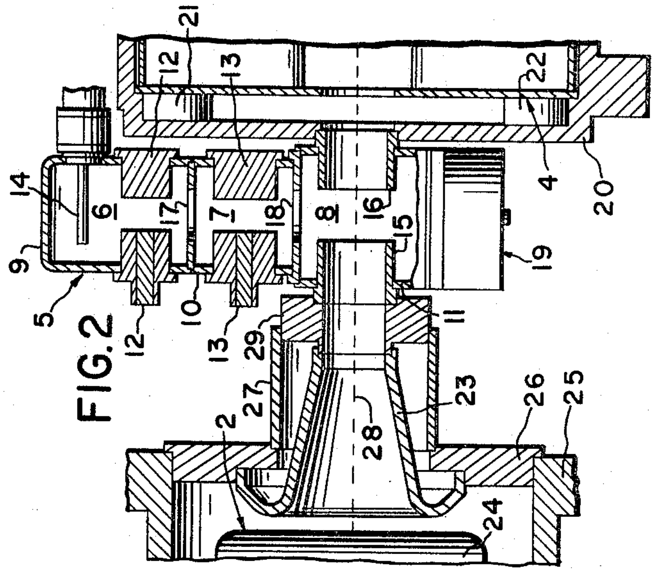
FIG. 2 is an enlarged cross-sectional view of the novel coupling means for the present invention delineated by lines 2—2 of FIG. 1.

Turning our attention now in detail to FIG. 2 there is shown therein the novel resonant circuit coupling means 5 of the present invention. Said coupling means comprises three coupled cavities 6, 7 and 8. Said cavities are formed by housing members 9, 10 and 11, as shown, preferably of a high conductivity material such as copper. Each of cavities 6 and 7 is provided with capacitive slug loading means 12 and 13, respectively, to reduce cavity size for the particular frequencies involved. Input cavity 6 is provided with a coaxial probe 14, while output cavity 8 is provided with drift tubes 15 and 16, respectively. Cavities 6, 7 and 8 are provided with inductive coupling irises 17 and 18, respectively. Cavities 6, 7 and 8 may be tuned by conventional tuning means generally indicated by 19. Conventional cloverleaf slow wave circuit section 4 is supported on the end thereof in step member 20. Step member 20 containing attenuating means 21, 22 respectively, as well as containing other similar attenuating means not shown provides a suitable termination for the slow wave circuit at the input section thereof. The attenuating means may take the form of four equally spaced carbon loaded annular ceramic discs 21, 22. In lieu of the four annular carbon loaded ceramic discs the present invention includes other conventional attenuation means, such as a carbon loaded ring like member. Drift tube 16 is attached to member 20, first anode means 23 is attached to mounting plate 26 which is connected to housing 25 as shown. Annular mounting plate 26 together with cylindrical support member 27 complete the gun end housing means. An electron beam represented by dotted line 28 emanates from a cathode through focusing ring 24. A conventional cathode is disposed within focusing ring 24. Housing 25 coupled with mounting plate 26, anode means 23, and support member 29 as well as cavity housings 9, 10 and 11 and step member 20, form a part of the vacuum tight enclosure for the tube.

Cavities 6, 7 and 8 are tuned to the same frequency $f_0$ which is the center frequency of the operating band of the traveling wave tube. This results in multiple tuning and thus broad banding of the input circuit. Drift tubes 15 and 16 being dimensionally smaller than the slow wave circuit are designed to be beyond cutoff for the operating frequency band of the slow wave circuit as well as BWO's and band edge oscillations and thus are incapable of propagating R.F. energy over the operating band.

Preferably, considering the size limitation dictated by the electron beam, drift tube 16 is designed to be cutoff for frequencies below the desired tube bandwidth including the upper band edge. Since the cavities 6, 7 and 8 are comparable to a band pass circuit, tuned to the operating band of the tube, the combination of the cutoff drift tube 16 and the coupled cavities will additionally preclude higher order modes and harmonics of the fundamental from coupling to the input. Coupling takes place as follows: R.F. energy is coupled into cavity 6 through probe 14 transferred through coupling iris 17 to cavity 7. Coupling between 7 and 8 is also through an iris 18. R.F. energy is thence transferred to the electron beam in klystron type cavity 8, having drift tubes 15 and 16 therein wherein the electron beam is velocity modulated at the R.F. drive frequency, whereupon the beam passes through the traveling wave tube structure and is thereupon coupled into the main slow wave circuit which in this case is a cloverleaf circuit. Attenuating means 21, 22 will not adversely affect the velocity modulated beam since no R.F. energy is propagated therein.

Figure 5:
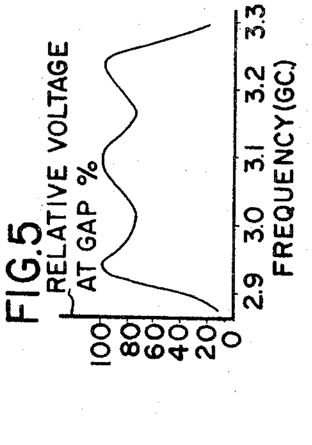
FIG. 5 is a typical response curve for coupled resonant circuits such as shown in FIG. 2.

FIG. 5 depicts a typical response curve for coupled resonant circuits such as shown in FIG. 2 wherein relative gap voltage vs. frequency is plotted for the three cavities 6, 7, 8 tuned to the same frequency. The response curve for such a multiple resonant circuit will have only one peak or hump, when the coupling between circuits is equal to or less than the critical value. When the coupling between stages exceeds this critical value the response curve begins to widen and will exhiibt two or more peaks depending on the number of resonant circuits involved. Coupling beyond critical coupling is referred to as heavy or over coupling. It is seen upon examination of FIG. 5 that three peaks are present which peaks are dispersed over a relatively wide band. A crystal filter positioned in the gap of cavity 8 is utilized to measure relative gap voltage over the operating band of the tube as a percent of R.F. voltage introduced at the input 14. The present invention also includes the case where stagger tuning of the multiple resonant cavities is utilized for broadbanding purposes. This involves tuning the individual cavities to different frequencies which generally results in asymmetric curves wherein the peaks have different amplitudes. However, the peaks may be adjusted to the same amplitude by suitable variations of the Q's of the cavities.

Turning our attention now to oscillations which are generally present in traveling wave tubes operated at high powers such as shown herein, it is the resultant benefit of the present invention that BWO's present on the slow wave circuit within and below the operating band will not in this case propagate through drift tubes 15 and 16 but will instead be absorbed by attenuating means 21, 22. Band edge oscillations caused by the beam voltage sweeping through the point of synchronism with the band edges of the operating mode will be prevented from entering the input circuit 5 since drift tube 16 is beyond cutoff for these oscillations. Attenuating means 21, 22 will absorb band edge oscillations as well as BWO's. Therefore, the input circuit is effectively protected from spurious oscillations existing on the main circuit and stabilization of the TWT results.

Figure 4:
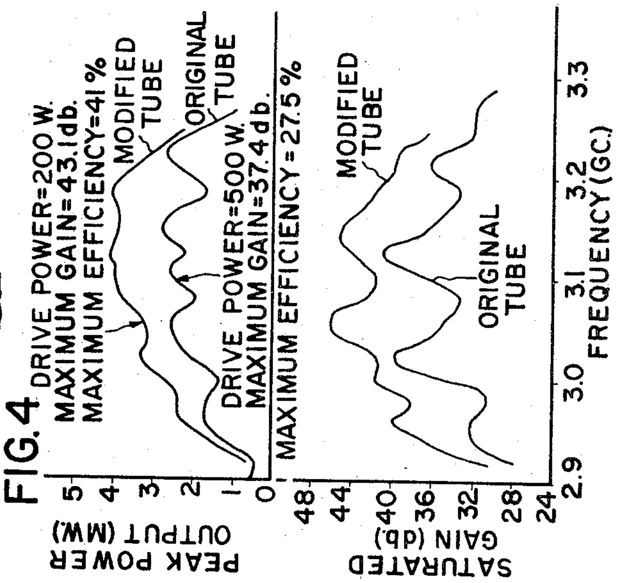
FIG. 4 is a graphical representation of frequency vs. power output and frequency vs. gain for the TWT of FIG. 1 embodying the coupler of FIG. 2 in comparison with the same parameters of a traveling wave tube as shown in FIG. 1 with a conventional coaxial coupler input.

Examination of FIG. 4 shows a definite increase in power output for the traveling wave tube of FIG. 1 incorporating the coupling means depicted in FIG. 2 when compared to a traveling wave tube such as shown in FIG. 1 with a conventional coaxial coupler as shown and described in copending application, U.S. Ser. No. 56,415. FIG. 4 also shows saturated gain vs. frequency for a given input power using a 120 kv. pulsed beam again comparing a modified vs. original input circuit. By original, we are referring to conventional coaxial coupling as shown in the aforementioned U.S. application. Furthermore, examination of FIG. 4 shows that considerable smoothness is achieved in both power output and gain characteristics over the operating frequency band of the tube when utilizing the resonant circuit coupler of the present invention. Cavities 6, 7 and 8 as previously mentioned are preferably tuned to the same frequency, $f_0$. This in addition to their being over-coupled results in considerable broadbanding of the input coupler. This, of course, is evidenced by the characteristics depicted in FIGS. 4 and 5. However, it is to be noticed that cavities 6 and 7 may be eliminated and a direct waveguide coupling or coaxial line may be used to couple the R.F. energy to klystron type cavity 8. This will still result in enhanced uniform coupling as opposed to a coaxial coupling device and will only result in decreased bandwidth for the coupling device. Furthermore, the novel coupling means depicted in FIG. 2 may advantageously be employed as an output coupling circuit for traveling wave tubes and the present invention so contemplates.

Figure 3:
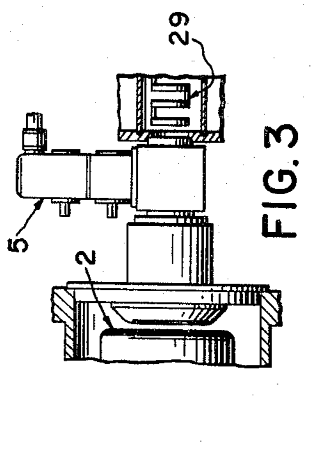
FIG. 3 is a cross-sectional view partially in elevation of the novel coupling means of the present invention incorporated in a TWT having a ring and bar type slow wave circuit.

Turning our attention to FIG. 3 there is depicted the novel coupling circuits of FIG. 2 incorporated in a traveling wave tube, utilizing a ring and bar type of circuit 29. This illustrates the flexibility of the input circuit of the present invention. Obviously the coupler of FIG. 2 may be incorporated advantageously in any traveling wave tube circuit. The particular details of the slow wave circuit depicted in FIG. 3 will not be elaborated upon here since the prior art has adequately described same. See U.S. Patent 2,937,311 by M. Chodorow. A high power traveling wave tube, such as shown in FIG. 1 and incorporating the novel input coupling means depicted in FIG. 2 was tested and operated successfully in the frequency range of 2.9 to 3.2 gc. It was shown conclusively that oscillations present in the main slow wave circuit within the operating band could not enter the input circuit. It is to be noted that other terminating or attenuation means than discs 21, 22 could advantageously be positioned in member 20.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A forward wave traveling wave tube for amplifying electromagnetic energy within a predetermined band of frequencies defining a central electron beam axis having slow wave circuit means disposed along said axis, and electromagnetic energy coupling means therefor, said electromagnetic energy coupling means comprising a broadband resonant cavity coupled to said slow wave circuit, said slow-wave circuit being adapted and arranged to have substantially unidirectionally energy transport for fundamental mode electromagnetic energy, said resonant cavity adapted and arranged to couple electromagnetic energy within said predetermined band of frequencies directly to said beam while preventing direct electromagnetic coupling of electromagnetic energy within said predetermined band of frequencies between said resonant cavity and said slow wave circuit.

2. The tube as defined in claim 1, wherein said resonant cavity coupled to said slow wave circuit has drift tube means therein surrounding said central electron beam axis.

3. The tube as defined in claim 2, wherein a plurality of resonant cavities are coupled to said resonant cavity surrounding said central electron beam axis.

4. The tube as defined in claim 3, wherein said resonant cavities are designed to pass said predetermined band of frequencies and wherein said drift tube means are designed to be cut off over said predetermined band of frequencies.

5. A forward wave traveling wave tube for amplifying electromagnetic energy within a predetermined band of frequencies comprising: electron gun means disposed at one end of a predetermined line of circuit development, said electron gun means being adapted and arranged to generate and direct an electron beam along said predetermined line of circuit development, collector means disposed at the other end of said predetermined line of circuit development, a slow wave structure disposed therebetween and operatively connected thereto, and means for coupling electromagnetic energy within said predetermined band of frequencies to said slow wave circuit through the mechanism of velocity modulation of said beam by said electromagnetic energy said coupling means comprising a broadband resonant circuit, said resonant circuit adapted and arranged such that electromagnetic energy is coupled directly to said beam, said broadband resonant circuit means including a plurality of coupled resonant cavities, said plurality of coupled resonant cavities being overcoupled and individually tuned to substantially the same resonant frequency.

6. A forward wave traveling wave tube for amplifying electro-magnetic energy within a predetermined band of frequencies comprising: electron gun means disposed at one end of a predetermined line of circuit development, said electron gun means being adapted and arranged to generate and direct an electron beam along said predetermined line of circuit development, collector means disposed at the other end of said predetermined line of circuit development, a slow wave structure disposed therebetween and operatively connected thereto, and means for coupling electromagnetic energy within said predetermined band of frequencies to said slow wave circuit through the mechanism of velocity modulation of said beam by said electromagnetic energy, said coupling means comprising a broadband resonant circuit, said resonant circuit adapted and arranged such that electromagnetic energy is coupled directly to said beam, said broadband resonant circuit means comprising a plurality of coupled resonant cavities, the input cavity of said plurality of coupled resonant cavities being provided with coaxial coupling means and the output cavity of said plurality of coupled resonant cavities having klystron type drift tube means therein for facilitating coupling between electromagnetic wave energy to be amplified and an electron beam.

7. A forward wave traveling wave tube for amplifying electromagnetic energy within a predetermined band of frequencies comprising: electron gun means disposed at one end of a predetermined line of circuit development, said electron gun means being adapted and arranged to generate and direct an electron beam along said predetermined line of circuit development, collector means disposed at the other end of said predetermined line of circuit development, a slow wave structure disposed therebetween and operatively connected thereto, and means for coupling electromagnetic energy within said predeterminedmined band of frequencies to said slow wave circuit through the mechanism of velocity modulation of said beam by said electromagnetic energy, said coupling means comprising a broadband resonant circuit, said resonant circuit adapted and arranged such that electromagnetic energy is coupled directly to said beam, said broadband resonant circuit coupling means having a portion thereof disposed about said predetermined line of circuit development, said predetermined line of circuit development being coincident with the electron beam axis of an electron beam emanating from said electron gun, said portion of said broadband resonant circuit coupling means disposed about said electron beam axis having drift tube means disposed therein, said drift tube means surrounding said electron beam axis.

8. The traveling wave tube defined in claim 7 wherein said drift tube means are beyond cutoff over said predetermined band of frequencies to be amplified including the upper band edge of the slow wave circuit passband.

9. A forward wave traveling wave tube for amplifying electromagnetic energy within a predetermined band of frequencies comprising: electron gun means disposed at one end of a predetermined line of circuit development, said electron gun means being adapted and arranged to generate and direct an electron beam along said predetermined line of circuit development, collector means disposed at the other end of said predetermined line of circuit development, a slow wave structure disposed therebetween and operatively connected thereto, and means for coupling electromagnetic energy within said predetermined band of frequencies to said slow wave circuit through the mechanism of velocity modulation of said beam by said electromagnetic energy, said coupling means comprising a broadband resonant circuit, said resonant circuit adapted and arranged such that electromagnetic energy is coupled directly to said beam, said tube including R.F. attenuating means disposed near said slow wave circuit at the input portion of said slow wave circuit.

10. A traveling wave tube comprising a slow wave structure disposed along a predetermined line of circuit development, electron gun and collector means disposed along said predetermined line of circuit development and operatively connected to said slow wave circuit, and electromagnetic input coupling means for said slow wave circuit, said electromagnetic input coupling means comprising a plurality of resonant cavities heavily coupled together, each of said resonant cavities being tuned to the same frequency, and attenuating means disposed near said slow wave circuit in the input portion of said slow wave circuit.

11. A traveling wave tube comprising a cloverleaf slow wave structure having input coupling means for introducing electromagnetic wave energy at a signal frequency within the operating bandwidth of the slow wave structure, said cloverleaf slow wave circuit being operatively connected to electron gun means and collector means disposed on opposite ends of said slow wave circuit, said input coupling means comprising three tuned cavities, said cavities having capacitive loading means therein, and wherein one of said tuned cavities has capacitive loading means which comprise drift tube means surrounding the electron beam emanating from the electron gun means disposed at one end of said traveling wave tube.

12. A traveling wave tube as defined in claim 11, wherein said drift tube means are designed such that they are beyond cutoff over the operating frequency range of said slow wave circuit.

13. A traveling wave tube for amplifying electromagnetic wave energy within a predetermined band of frequencies, said traveling wave tube including, electron gun means disposed at the one end portion thereof for generating and directing an electron beam along a central beam axis of said tube, slow wave interaction circuit means disposed along the central beam axis and collector means disposed at the other end portion of said tube, said tube including R.F. coupling means for introducing electromagnetic wave energy to be amplified into said tube at frequencies within said predetermined band of frequencies, said R.F. coupling means including a resonant cavity disposed about said central beam axis, said traveling wave tube further including drift tube means disposed about said central beam axis between said slow wave interaction circuit and said R.F. coupling means, said drift tube means being beyond cut-off over said predetermined band of frequencies to be amplified.

14. A traveling wave tube for amplifying electromagnetic wave energy within a predetermined band of frequencies, said traveling wave tube including, electron gun means disposed at the one end portion thereof for generating and directing an electron beam along a central beam axis of said tube, slow wave interaction circuit means disposed along the central beam axis and collector means disposed at the other end portion of said tube, said tube including R.F. coupling means for introducing electromagnetic wave energy to be amplified into said tube at frequencies within said predetermined band of frequencies, said R.F. coupling means including a resonant cavity disposed about said central beam axis, said resonant cavity including a pair of drift tubes re-entrantly disposed therein about the central beam axis, said drift tubes being cut-off over said predetermined band of frequencies to be amplified, said R.F. coupling means further including a second resonant cavity coupled to said resonant cavity, said second resonant cavity being radially displaced from said central beam axis.

References Cited

UNITED STATES PATENTS

| | | | |
|---|---|---|---|
| 2,626,371 | 1/1953 | Barnett et al. | 315—3.6 |
| 2,819,424 | 1/1958 | Brewer | 315—3.5 |
| 2,936,395 | 5/1960 | Everhart | 315—3.5 |
| 3,087,119 | 4/1963 | Cook et al. | 315—3.6 X |
| 3,101,449 | 8/1963 | Ashkin | 315—3.6 X |

OTHER REFERENCES

Southworth, G. C.: Principles and Applications of Waveguide Transmission, D. Van Nostrand Inc., Princeton, N.J., 1961, p. 300 relied on.

HERMAN KARL SAALBACH, *Primary Examiner.*

ELI LIEBERMAN, *Examiner.*

P. L. GENSLER, *Assistant Examiner.*